United States Patent
Varada et al.

(10) Patent No.: US 11,991,588 B2
(45) Date of Patent: May 21, 2024

(54) MOVEMENT PATTERN BASED AUTO-PAIRING

(71) Applicant: International Business Machines Corporation, Armonk, NY (US)

(72) Inventors: Sri Harsha Varada, Vizianagaram (IN); Venkata Vara Prasad Karri, Visakhapatnam (IN); Sarbajit K. Rakshit, Kolkata (IN); Avadhanula Kishore, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 17/469,959

(22) Filed: Sep. 9, 2021

(65) Prior Publication Data

US 2023/0070667 A1 Mar. 9, 2023

(51) Int. Cl.
*H04W 4/80* (2018.01)
*H04W 4/02* (2018.01)

(52) U.S. Cl.
CPC ............. *H04W 4/023* (2013.01); *H04W 4/80* (2018.02)

(58) Field of Classification Search
CPC ...................................................... H04W 4/80
USPC ........................................................ 455/41.2
See application file for complete search history.

(56) References Cited

U.S. PATENT DOCUMENTS

| | | | | |
|---|---|---|---|---|
| 6,961,541 | B2 * | 11/2005 | Overy | H04L 67/52 |
| | | | | 713/168 |
| 8,750,894 | B1 * | 6/2014 | Stogaitis | H04W 4/02 |
| | | | | 370/325 |
| 9,801,004 | B2 * | 10/2017 | Liu | H04W 12/04 |
| 2003/0220765 | A1 * | 11/2003 | Overy | H04W 12/08 |
| | | | | 702/158 |

(Continued)

FOREIGN PATENT DOCUMENTS

KR 101125141 B1 3/2012

OTHER PUBLICATIONS

Lester et al., "'Are You With Me?'—Using Accelerometers to Determine if Two Devices are Carried by the Same Person", International Conference on Pervasive Computing, Mar. 2004, 18 pages.

(Continued)

*Primary Examiner* — April G Gonzales
(74) *Attorney, Agent, or Firm* — Stephen R. Yoder

(57) ABSTRACT

A computer-implemented method for automatically pairing two devices is disclosed. The computer-implemented method includes detecting a first type of movement from a first device. The computer-implemented method further includes determining that the first device is located within a threshold distance of a second device when the first type of movement from the first device is detected. The computer-implemented method further includes determining whether an auto-pairing policy matches the first type of movement from the first device and the threshold distance between the first and second devices. The computer-implemented (Continued)

method further includes, responsive to determining that the auto-pairing policy matches the first type of movement from the first device and the threshold distance between the first and second devices, automatically pairing the first device and the second device.

15 Claims, 5 Drawing Sheets

(56) References Cited

U.S. PATENT DOCUMENTS

| | | | | |
|---|---|---|---|---|
| 2010/0120406 | A1* | 5/2010 | Banga | H04W 52/0245 455/418 |
| 2011/0319022 | A1* | 12/2011 | Arad | H04B 5/48 455/41.2 |
| 2012/0250539 | A1* | 10/2012 | Lin | H04W 4/21 455/67.11 |
| 2012/0322380 | A1* | 12/2012 | Nannarone | G08B 21/0275 455/67.11 |
| 2013/0029661 | A1* | 1/2013 | Fong | G08B 21/22 455/67.11 |
| 2013/0154917 | A1* | 6/2013 | Adermann | G06F 3/005 345/156 |
| 2014/0206288 | A1* | 7/2014 | Liu | H04W 4/80 455/41.2 |
| 2015/0024678 | A1* | 1/2015 | Chang | H04W 76/14 455/39 |
| 2015/0140934 | A1* | 5/2015 | Abdurrahman | H04W 76/14 455/41.2 |
| 2015/0163843 | A1* | 6/2015 | Zhu | H04L 63/0869 455/41.2 |
| 2016/0014545 | A1* | 1/2016 | Tian | H04W 76/10 455/41.2 |
| 2016/0173930 | A1* | 6/2016 | Jin | H04N 21/4532 725/40 |
| 2016/0192407 | A1* | 6/2016 | Fyfe | H04W 4/80 370/328 |
| 2017/0010674 | A1* | 1/2017 | Ide | H04W 12/065 |
| 2017/0193787 | A1* | 7/2017 | Devdas | G08B 25/005 |
| 2018/0208016 | A1* | 7/2018 | O'Brien | B60H 1/00207 |
| 2018/0277123 | A1* | 9/2018 | Boesen | H04R 1/1041 |
| 2018/0302416 | A1* | 10/2018 | Einberg | H04W 12/08 |
| 2019/0383921 | A1* | 12/2019 | Argentieri | G08B 21/22 |

OTHER PUBLICATIONS

Liu, Bo, "Fast Pair makes it easier to use your Bluetooth headphones", Google, downloaded from the Internet on Jun. 10, 2021, 6 pages, <https://blog.google/products/android/fast-pair-easier-bluetooth/>.

Mell et al., "The NIST Definition of Cloud Computing", Recommendations of the National Institute of Standards and Technology, NIST Special Publication 800-145, Sep. 2011, 7 pages.

Youtube, "Noise Buds Play—How to use Google Fast Pairing", Mar. 31, 2021, 2 pages, <https://www.youtube.com/watch?v=cJt_eV7fnCA>.

* cited by examiner

MOVEMENT PATTERN BASED AUTO-PAIRING

BACKGROUND

The present invention relates generally to the field of pairing electronic devices, and more particularly to auto-pairing electronic devices based on movement patterns.

Pairing is the process of establishing a connection between two electronic devices, such as a smartwatch, mobile phone, vehicle, television, smart plug, speakers, headphones, laptop, electric lightbulb, or tablet. Once paired together, the two devices can share and transmit information with each other. The most common example is used with Bluetooth devices, in which the pairing process is used to wirelessly connect two Bluetooth devices. Auto-pairing is when two electronic devices automatically wirelessly connect to each other. Auto-pairing typically happens after two electronic devices have previously shared a wireless connection with each other or come within a particular range of each other.

SUMMARY

According to one embodiment of the present invention, a computer-implemented method for automatically pairing two devices is disclosed. The computer-implemented method includes detecting a first type of movement from a first device. The computer-implemented method further includes determining that the first device is located within a threshold distance of a second device when the first type of movement from the first device is detected. The computer-implemented method further includes determining whether an auto-pairing policy matches the first type of movement from the first device and the threshold distance between the first and second devices. The computer-implemented method further includes, responsive to determining that the auto-pairing policy matches the first type of movement from the first device and the threshold distance between the first and second devices, automatically pairing the first device and the second device.

According to another embodiment of the present invention, a computer program product for automatically pairing two devices is disclosed. The computer program product includes one or more computer readable storage media and program instructions stored on the one or more computer readable storage media. The program instructions include instructions to detect a first type of movement from a first device. The program instructions include further include instructions to determine that the first device is located within a threshold distance of a second device when the first type of movement from the first device is detected. The program instructions include instructions to determine whether an auto-pairing policy matches the first type of movement from the first device and the threshold distance between the first and second devices. The program instructions include instructions to, responsive to determining that the auto-pairing policy matches the first type of movement from the first device and the threshold distance between the first and second devices, automatically pair the first device and the second device.

According to another embodiment of the present invention, a computer system for automatically pairing two devices is disclosed. The computer system includes one or more computer processors, one or more computer readable storage media, and computer program instructions, the computer program instructions being stored on the one or more computer readable storage media for execution by the one or more computer processors. The program instructions include instructions to detect a first type of movement from a first device. The program instructions include further include instructions to determine that the first device is located within a threshold distance of a second device when the first type of movement from the first device is detected. The program instructions include instructions to determine whether an auto-pairing policy matches the first type of movement from the first device and the threshold distance between the first and second devices. The program instructions include instructions to, responsive to determining that the auto-pairing policy matches the first type of movement from the first device and the threshold distance between the first and second devices, automatically pair the first device and the second device.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
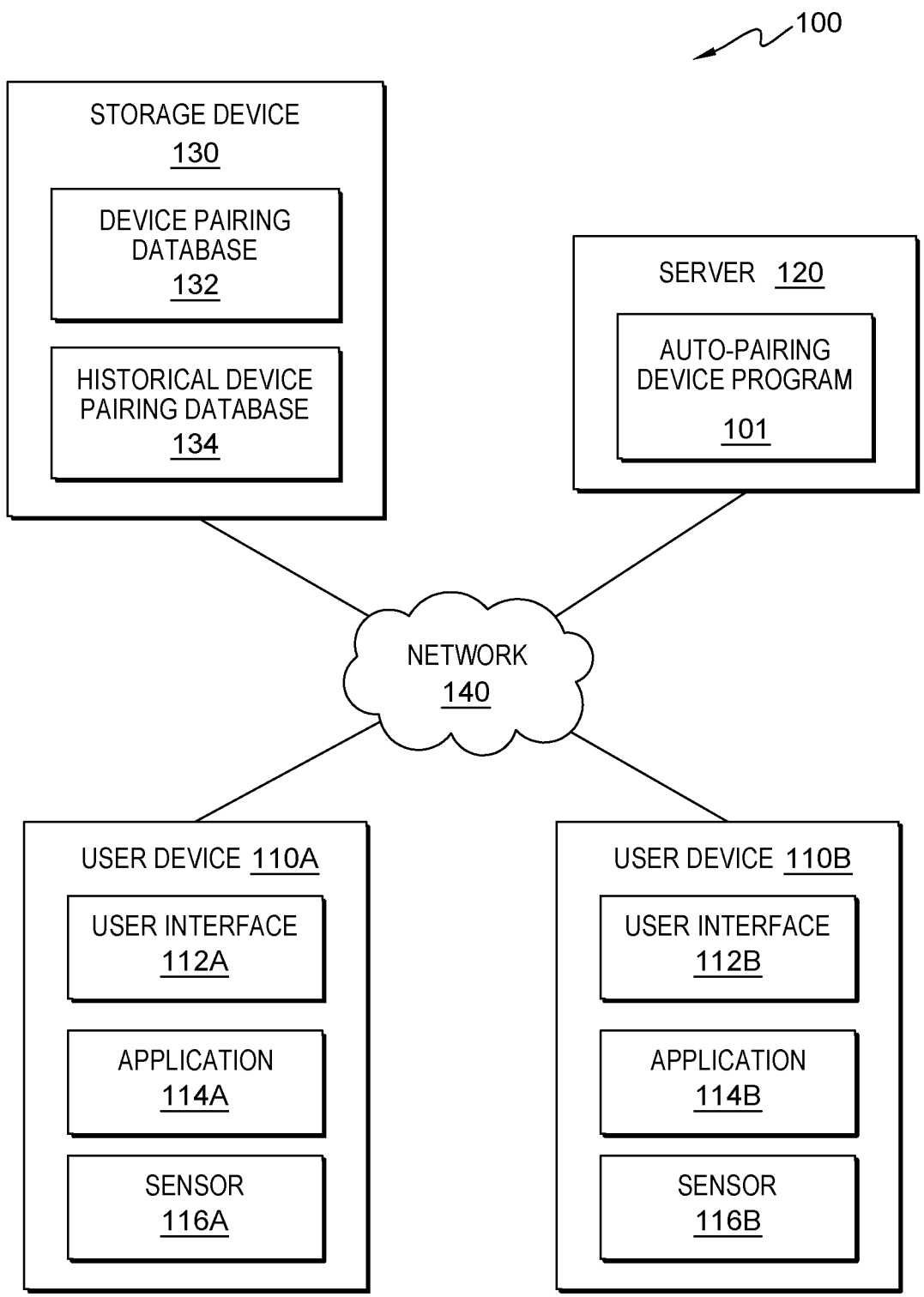
FIG. 1 is a block diagram of a network computing environment for auto-pairing two devices, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of pairing electronic devices, and more particularly to auto-pairing electronic devices based on movement patterns.

Typically, the first time two electronic devices are wirelessly connected to each other, the user is required to manually pair the two electronic devices. Manual pairing can include requesting and accepting a pairing request. Manual pairing can be tedious and time consuming. After two electronic devices have been paired before, they can be automatically paired together in the future. For example, if device 1 and device 2 were previously paired with each other, and the two devices come within a threshold distance (e.g., 5 feet of each other), device 1 will automatically pair with device 2. Embodiments of the present inventions recognize that people frequently switch between different devices, or bother other people's devices, even temporarily. For example, user A's smartwatch is paired with user A's smartphone. Since user A's smartwatch paired with user A's smartphone, the smartwatch and smartphone may automatically pair in the future. However, if user A borrows user B's smartphone, if user A's smartphone and user B's smartphone have never paired before, then user A may be required to manually pair the two smartphones. Thus, embodiments of the present invention recognize the need for automatically pairing two devices that may or may not have been previously paired. For example, an ability to auto-pair user A's devices, such as user A's smartwatch, with user B's phone.

Embodiments of the present invention recognize the need for a method to determine which devices are being used together or for a common purpose, and accordingly, auto-pair those devices that are being used together for a common purpose. Embodiments of the present invention recognize that it would be advantageous to automatically pair devices based on determining the relative motion of each device, which can ultimately indicate which devices are being used together, and thus automatically paired. In an embodiment, device sensor data can be used to determine the relative movement pattern among two or more devices within a proximity distance, and thereby determine that two or more devices should be auto paired with one another. In an embodiment, historical device movement data when previously paired to one another is used to learn when devices should be automatically paired and/or unpaired from each other. In an embodiment, the types of devices that are to be auto-paired with each other and the particular information or signals that can be shared between paired devices is identified. Embodiments of the present invention enable the user to visualize the auto pair action between the source and destination devices and its data flow between the two using augmented reality. Embodiments of the present invention use contextual device policies to enable auto pairing to known users nearby and restricting auto pairing to unknown users nearby that conflict with the device policy.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment for auto-pairing two devices, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110A, user device 110B, server 120, and storage device 130 interconnected over network 140. User device 110A and user device 110B may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110A and user device 110B can represent any programmable electronic device or combination of programmable electronic devices capable of executing machine readable program instructions and communicating with server 120, storage device 130, and other devices (not depicted) via a network, such as network 140. User device 110A and user device 110B can include internal and external hardware components, as depicted and described in further detail with respect to FIG. 3.

User device 110A further includes user interface 112A, application 114A, and sensor 116A. User device 110B further includes user interface 112B, application 114B, and sensor 116B. User interface 112A and 112B are programs that provide an interface between a user of an end user device, such as user device 110A and user device 110B, and a plurality of applications that reside on the device (e.g., application 114). A user interface, such as user interface 112A and 112B, refers to the information (such as graphic, text, and sound) that a program presents to a user, and the control sequences the user employs to control the program. A variety of types of user interfaces exist. In one embodiment, user interface 112A and 112B are graphical user interfaces. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112A and 112B are scripts or application programming interfaces (APIs).

Application 114A and 114B can be representative of one or more applications (e.g., an application suite) that operate on user device 110A and user device 110B, respectively. In an embodiment, application 114A and 114B are representative of one or more applications (e.g., social media applications, web conferencing applications, and email applications) located on user device 110A and user device 110B, respectively. In various example embodiments, application 114A and 114B can be an application that a user of user device 110A and user device 110B utilizes to participate in auto-pairing devices based on movement patterns. In an embodiment, application 114A and 114B can be a client-side application associated with a server-side application running on server 120 (e.g., a client-side application associated with auto-pairing device program 101). In an embodiment, application 114A and 114B can operate to perform processing steps of auto-pairing device program 101 (i.e., application 114A and 114B can be representative of auto-pairing device program 101 operating on user device 110A and user device 110B).

Sensor 116A and sensor 116B can be representative of one or more sensors on user device 110A and user device 110B. In an embodiment, sensor 116A and sensor 116B can be any generally known sensors, including, but not limited to accelerometers, movements or motion sensors, and compass sensors that are capable of capture various movement data of a user and/or user device, such as user device 110A and 110B, in which the movement data is then used to identify the movement patterns among user device 110A and user device 110B. In an embodiment, a movement pattern includes one or more of, but not limited to, rotating, oscillating, straight line movement, or any known types of measurable movement of a single device. In an embodiment, a movement pattern includes one or more of, but not limited to, rotating, oscillating, straight line movement, or any known types of measurable movement between two or more devices.

Server 120 is configured to provide resources to various computing devices, such as user device 110A and 110B. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110A, user device 110B, storage device 130, and other computing devices (not shown) within network computing environment 100 via a network, such as network 140.

In an embodiment, server 120 includes auto-pairing device program 101. In an embodiment, auto-pairing device program 101 may be configured to access various data sources, such as device pairing database 132, that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, auto-pairing device program 101 enables the authorized and secure processing of personal data. In an embodiment, auto-pairing device program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, auto-pairing device program 101 provides information regarding personal data and the nature (e.g., type, scope, purpose, duration, etc.) of the processing. In an embodiment, auto-pairing device program 101 provides a user with copies of stored personal data. In an embodiment, auto-pairing device program 101 allows for the correction or completion of incorrect or incomplete personal data. In an embodiment, auto-pairing device program 101 allows for the immediate deletion of personal data.

Figure 3:
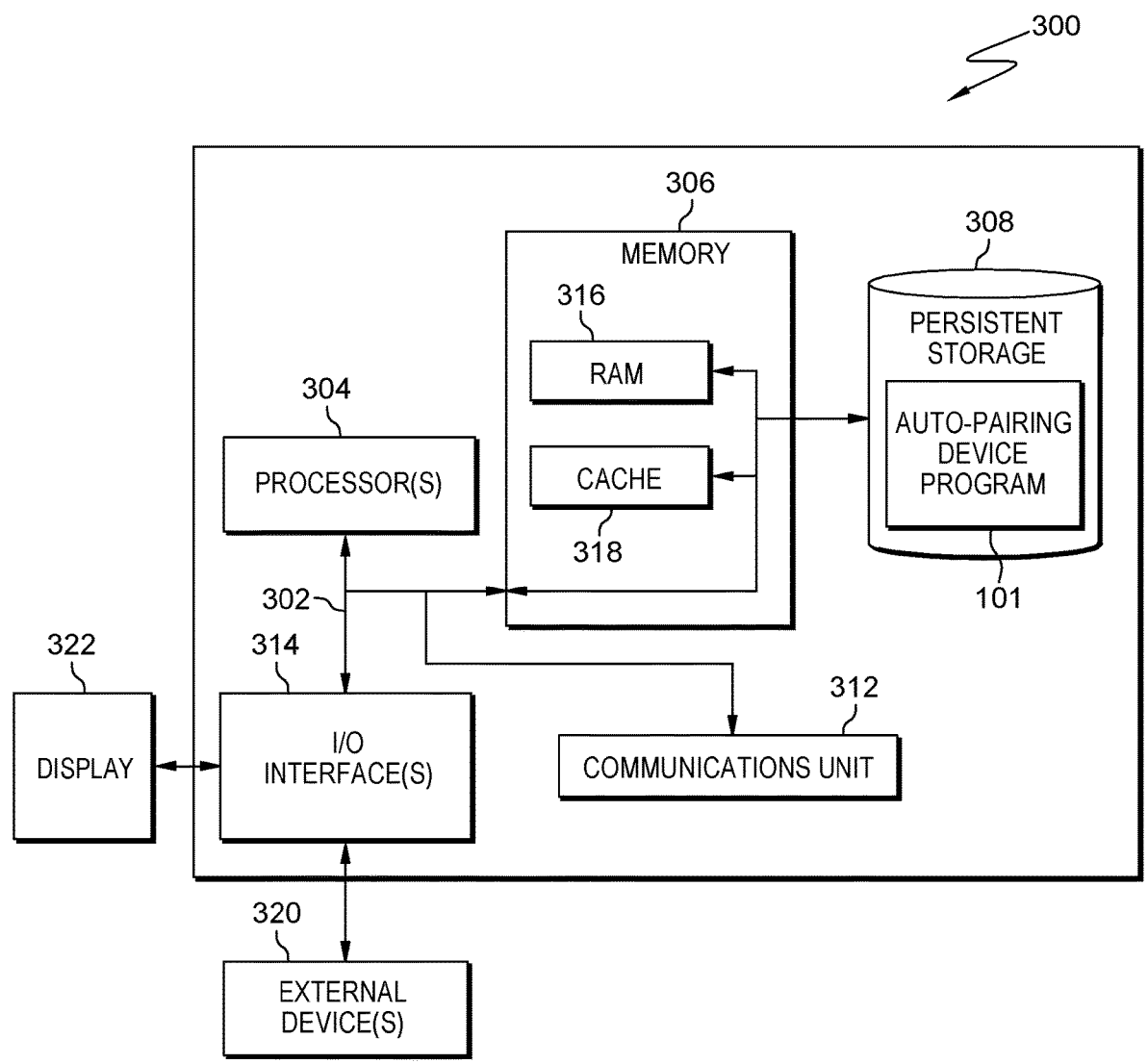
FIG. 3 is a block diagram depicting components of a computer, generally designated 300, suitable for executing an auto-pairing device program 101 in accordance with at least one embodiment of the present invention.
Figure 4:
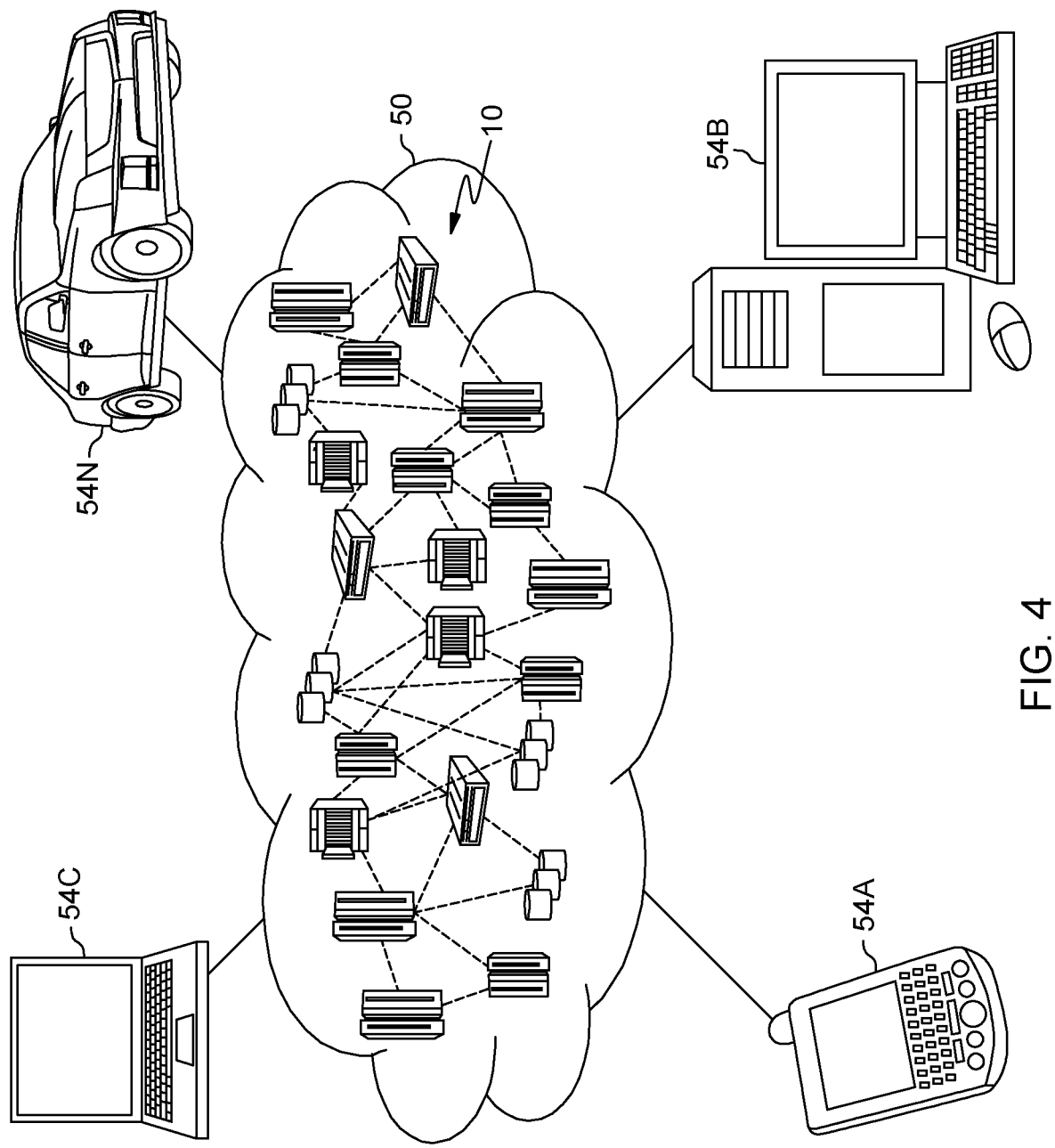
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at least one embodiment of the present invention.

In various embodiments, storage device 130 is a secure data repository for persistently storing historical device movement pattern information and historical device auto-pairing information that is utilized by an auto-pairing device program 101 to determine whether to auto-pair and/or auto-unpair two devices, such as user devices 110A and 110B. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, device pairing database 132 contains information on one or more auto pairing policies. In an embodiment, the pairing policies include a dynamic set of rules for automatically determining optimized decision or action(s) with respect to pairing or unpairing devices based on detected movements and/or movement patterns between devices. In an embodiment, device pairing database 132 includes a dynamic set of rules from a reinforcement learning algorithm that learns one or more policies for automatically pairing or unpairing devices based on detected movements and/or movement patterns between devices. In an embodiment, device pairing database 132 includes information describing different decision-making actions that auto-pairing device program 101 should perform depending on the particular movement data and proximity data identified between one or more devices. For example, device pairing database 132 may include a different set of rules as to whether two devices should auto-pair or auto-unpair based on the particular movement(s) of one or more devices when within a threshold proximity of each other. For example, device pairing database 132 may include one set of rules for auto-pairing or auto-unpairing two devices if auto-pairing device program 101 detects movement from only one device verses if auto-pairing device program 101 detects movement from two devices. In another example, device pairing database 132 may include one set of rules for auto-pairing two devices if auto-pairing device program 101 detects that the two devices are within a predetermined proximity threshold of each other and another set of rules for auto-unpairing two devices if auto-pairing device program 101 detects that the two devices are outside of a predetermined proximity threshold of each other.

In an embodiment, historical device pairing database 134 contains information on the previous movements, movement patterns, pairings, particular devices, and distances between previously paired devices. For example, historical device pairing database 134 contains information on a previous pairing of a smartwatch with a smart bulb and a movement of oscillation from the smartwatch and smart bulb while within a predetermined distance of each other. In an embodiment, auto-pairing device program 101 accesses the information in historical device pairing database 134 to collect information on previous movements, movement patterns, pairings, particular devices, and distances between paired devices in order to determine whether two or more devices should be auto-paired or auto-unpaired. For example, auto-pairing device program 101 collects information on previous movements and pairings to determine if two or more devices have previously paired. In an embodiment, historical device pairing database 134 contains information on the amount of time the two devices are paired for. For example, if the two devices are paired for 1 hour, auto-pairing device program 101 stores and collects this information from historical device pairing database 134.

In an embodiment, auto-pairing device program 101 automatically pairs two or more devices based, at least in part, on their proximity and type of movement(s) when within a threshold distance of each other. In an embodiment, auto-pairing device program 101 automatically unpairs two or more devices based, at least in part, on their proximity and type of movement(s) when outside a threshold distance of each other. In an embodiment, auto-pairing device program 101 detects movement from one or more devices. In an embodiment, auto-pairing device program 101 determines the type of movement from the one or more devices. For example, auto-pairing device program 101 detects movement from smartwatch A and determines an oscillating movement similar to a user flicking or turning their wrist to view the screen on their smartwatch. In an embodiment, auto-pairing device program 101 determines the proximity of two or more devices during a detected movement(s). For example, auto-pairing device program 101 determines that a smartwatch and smart television are 10 feet apart when a particular movement(s) of smartwatch A is detected. In an embodiment, a policy is determinative based on the types of devices. For example, one policy may be for a smart watch pairing with a phone and another policy may be for a phone pairing with a television.

In an embodiment, auto-pairing device program 101 determines the particular device associated with a detected movement based, at least in part, on a device ID of the device. A device ID is a unique number used to uniquely identify a device. In an embodiment, a device ID is a the device's MAC address, IMEI number, or ESN number. In an embodiment, the device ID and respective policy associated with the device ID is used to determine whether or not a device has been paired with another device before, and if so, the types of movement and a proximity of the device with another device when the detected type of movements are typically performed. For example, device A and device B were previously paired and historically perform a particular movement(s) when within a particular distance of each other. If these two devices are detected within the historical proximity of each other and are the historically performed type of movements are detected, then auto-pairing device automatically pairs device A and device B.

In an embodiment, auto-pairing device program 101 determines if a policy matches the movement and proximity of one or more devices. For example, auto-pairing device program 101 determines that a policy matches the particular type of movement(s) and proximity of the devices if the two devices are within a predetermined proximity threshold and the detected movement(s) of at least one of the devices matches or is similar to a particular movement(s) associated with a policy. For example, a similar movement can include a movement that compliments, is typical of, or is reflective of the type of device in use. For example, when using a smart watch, it is typical for a smartwatch to rotate while being worn on a user's wrist. In another example, when using a phone, it is typical for a phone to either be stationary or moving in the user's hand. For example, if auto-pairing device program 101 determines that a smartwatch and smartphone are 2 feet apart and auto-pairing device program 101 further determines that the smartwatch rotated while the smartphone moved up and down, auto-pairing device program 101 will automatically pair the two devices if an auto-pairing policy states that two devices should be auto-paired if two devices are within a proximity of 3 feet, and a smartwatch rotation motion and a smartphone up and down movement is detected while the two devices are within a 3 foot proximity of each other. In an embodiment, auto-pairing device program 101 determines a policy match if the two devices have paired together before. For example, if smart watch A and phone B have been paired together before, auto-pairing device program 101 determines a policy match with a policy for two devices that have been paired before.

In an embodiment, auto-pairing device program 101 determines if the movement detected is an ordered sequence of movements. For example, an ordered sequence of movements may be performing movement A, followed by, or at the same time, movement B, and then finally movement C. In an embodiment, the ordered sequence of movements can be detected from one or more devices. For example, if a first movement is detected in smartwatch A of twisting and a second movement of rotation from a smart light bulb B, auto-pairing device program 101 determines the two movements detected are an ordered sequence of movements.

In an embodiment, auto-pairing device program 101 determines if the policy permits automatically pairing two devices. If auto-pairing device program 101 determines the policy permits automatically pairing two devices, auto-pairing device program 101 pairs the two devices. In an embodiment, auto-pairing device program 101 determines a policy does not permit automatically pairing two devices if one of the devices is an unknown device. An unknown device can include one or more devices that have never paired together. In an embodiment, auto-pairing device program 101 determines when to automatically pair devices based at least in part on detecting distances between the two devices, the movement of one or more devices, the type of movement detected, the type of devices, the movement of one device with respect to the other device. For example, if device A and device B were previously paired and historically perform a particular movement when within a particular distance of each other, auto-pairing device program 101 will automatically pair device A and device B at a future time if these two devices are detected within the historical proximity of each other and are doing the historically performed movements. In an embodiment, auto-pairing device program 101 generates a new auto-pairing policy for when to automatically pair two devices based, at least in part, on one or more of historical device movement patterns, a length of previous device pairings, and proximities of devices performing the historical device movement patterns when previously paired.

In an embodiment, auto-pairing device program 101 determines the types of devices that can be auto-paired and identifies which information or signals can be shared between the paired devices. In an embodiment, auto-pairing device program 101 transmits the identified information or signals between the paired devices. For example, if a blood pressure monitor and a smartwatch are paired, only blood pressure information may be transmitted from the blood pressure monitor to the smartwatch. In another example, if a car is paired to a smartphone, auto-pairing device program 101 only shares information on the directions from the map on the smartphone to the car. In an embodiment, auto-pairing device program 101 displays the auto-pairing action and data flow on one or more devices. In an embodiment, auto-pairing device program 101 displays the auto-pairing action and data flow via augmented reality on an augmented reality enabled device.

In an embodiment, auto-pairing device program 101 determines the length of time that two devices are paired based on the policy. For example, if the policy allows for two devices to be paired together for 15 minutes, auto-pairing device program 101 pairs the devices together for 15 minutes and then automatically unpairs the devices after 15 minutes. In an embodiment, auto-pairing device program 101 uses historical learning to determine how long to pair, and thus when to unpair two or more devices.

In an embodiment, auto-pairing device program 101 determines when to automatically unpair devices based, at least in part, on detecting distances between the two devices, the movement of one or more devices, the type of movement detected, a predetermined amount of time, the type of devices connected, and movements of one device with respect to the other device. For example, a pairing of a smart phone and a smart television may be paired longer than if a smart watch and a smartphone are paired because it is typical for a smart television and smart phone to both be stationary when in use. In an embodiment, auto-pairing device program 101 detects a second type of movement from the second device and determines whether the auto-pairing policy matches the second type of movement from the second device. For example, if auto-pairing device program 101 detects a second type of movement from the second device, auto-pairing device program 101 determines whether there is an auto-pairing policy which matches the second type of movement detected.

In an embodiment, if auto-pairing device program 101 determines an ambiguity in determining the relative movement of one or more devices, auto-pairing device program 101 unpairs the devices and prompts manual pairing. For example, if auto-pairing device program 101 pairs smartwatch A and smart phone B and then is unable to determine the relative movement between smartwatch A or smart phone B, auto-pairing device program 101 unpairs smartwatch A and smart phone B. In an embodiment, auto-pairing device program 101 further prompts the manual pairing of smartwatch A and smart phone B.

In an embodiment, auto-pairing device program 101 identifies how long to pair two or more devices based on how long the devices are typically paired for. For example, if it is determined a smart phone is paired with an automobile, auto-pairing device program 101 may determine a smart phone is typically paired with an automobile until the automobile is parked or turned off. In an embodiment, auto-pairing device program 101 identifies how long to pair the two devices based on historical pairing times corresponding to previously paired devices. For example, if smartwatch A and smartphone B were previous paired for 2 hours, auto-pairing device program 101 determines to unpair smartwatch A and smartphone B after 2 hours.

In an embodiment, auto-pairing device program 101 determines how long to pair two devices based on historical movement patterns. For example, if a smartphone is paired with a smart watch, if auto-pairing device program 101 determines that a user has set down the smartphone (i.e., the user is no longer holding the smartphone), auto-pairing device program 101 automatically unpairs the smartphone and smart watch. In an embodiment, auto-pairing device program 101 automatically unpairs two devices if no movement is detected in at least one of the devices. In an embodiment, auto-pairing device program 101 automatically unpairs two devices if a type of movement is detected that indicates the two devices are no longer being used together. For example, if a smartphone and a smart television are paired and auto-pairing device program 101 detects movement that the smartphone was moved vertically up to the users ear to answer a phone call, auto-pairing device program 101 determines the two devices are no longer being used together and automatically unpairs the smartphone and smart television. In an embodiment, auto-pairing device program 101 automatically unpairs two devices if auto-pairing device program 101 determines relative movement above a predetermined threshold. In an embodiment, auto-pairing device program 101 creates policies for when to unpair two devices based at least in part on historical movement patterns, the length of previous pairings, and the type of devices paired.

In an example, auto-pairing device program 101 detects rotational movement from a smart watch and determines the smart watch is in close proximity to a blood pressure monitor. Auto-pairing device program 101 determines a policy which matches a smart watch moving rotationally in close proximity to a blood pressure monitor. If the policy allows for automatically pairing devices, auto-pairing device program 101 automatically pairs the smart watch and the blood pressure monitor. Further, auto-pairing device program 101 stores information regarding the pairing and the duration of the pairing of the smart watch and blood pressure monitor. Auto-pairing device program 101 unpairs the smart watch and the blood pressure monitor once the patient's blood pressure is determined.

In an example, user A needs to perform different manual activity, such as opening screw, handling objects. Auto-pairing device program 101 determines user A is wearing a smart watch and detects movement from the smartwatch in proximity to a smart lightbulb. Auto-pairing device program 101 determines the activity being performed from the smartwatch movement, such as screwing in a smart lightbulb. Auto-pairing device program 101 pairs the smart light bulb to user A's smart watch. Auto-pairing device program 101 further determines how much work is completed and accordingly transfer the remaining work to user B. In this example, auto-pairing device program 101 then pairs users B smart watch to the smart lightbulb. In this embodiment, effective work monitoring and work completion can be performed in a shop floor and phased way of pairing, unpairing and activity synchronization is recorded for future automation and corrective system planning.

Figure 2:
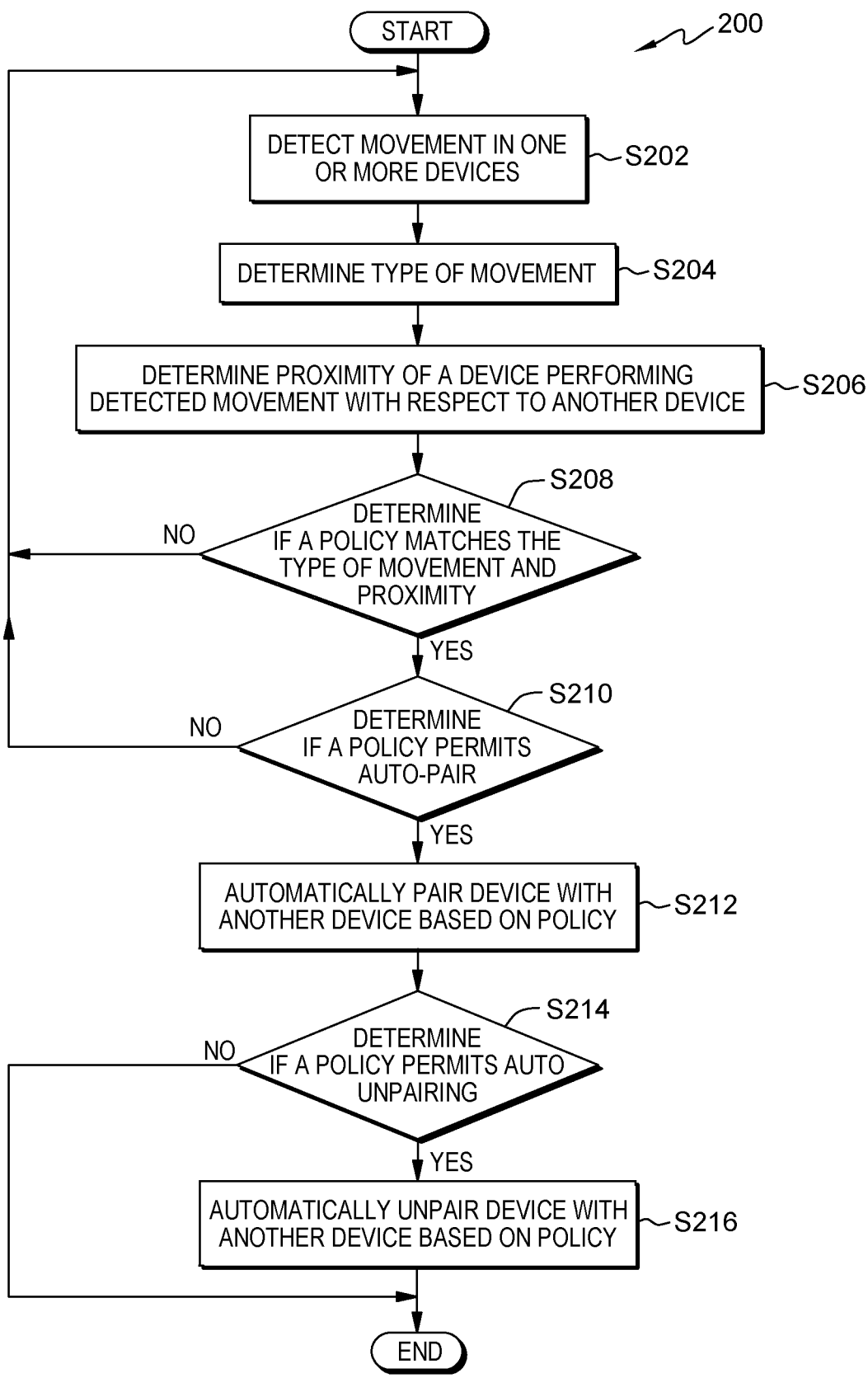
FIG. 2 is a flow chart diagram depicting operational steps for automatically pairing two devices, generally designated 200, in accordance with at least one embodiment of the present invention.

FIG. 2 is a flow chart diagram depicting operational steps for automatically pairing two devices, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, auto-pairing device program 101 detects movement in one or more devices. For example, auto-pairing device program 101 detects one or more particular movements from a smartwatch.

At step S204, auto-pairing device program 101 determines the type of movement. For example, auto-pairing device program 101 determines the movement received from a smartwatch is a rotational movement, similar to a user flipping or rotating their wrist. In another example, auto-pairing device program 101 determines the movement received from a smart phone is an up and down movement similar to when a user lifts a phone up to their ear.

At step S206, auto-pairing device program 101 determines a proximity of a device performing the detected movement with respect to another device. In an embodiment, auto-pairing device program 101 determines the distance between the two devices at the time the movement was detected. In an embodiment, auto-pairing device program 101 determines the average distance between the two devices while the detected movement is being performed. For example, if movement is detected from a smartwatch and a smartphone when the smart watch was rotated on the users wrist and the smart phone was being lifted to the users ear, auto-pairing device program 101 determines the average distance between the two devices.

At decision step S208, auto-pairing device program 101 determines if a policy matches the type of movement and proximity. In an embodiment, auto-pairing device program 101 evaluates one or more predetermined policies to determine if there is a policy which matches the type of movement and proximity of the two devices. If there is not a policy that matches the type of movement and proximity of the two devices (decision step S208 "NO" branch), auto-pairing device program 101 returns to step S202. If it is determined that a policy matches the type of movement and proximity of the two devices (decision step S208 "YES" branch), auto-pairing device program 101 proceeds to step S210.

At decision step S210, auto-pairing device program 101 determines if the policy permits auto-pair. If the policy does not permit auto-pair (decision step S210 "NO" branch), auto-pairing device program 101 returns to step S202. If the policy permits auto-pair (decision step S210 "YES" branch), auto-pairing device program 101 proceeds to step S212.

At step S212, auto-pairing device program 101 automatically pairs the device with another device based on the policy. In an embodiment, auto-pairing device program 101 determines the information to share between the devices based on the type of devices connected and the policy. In an embodiment, auto-pairing device program 101 determines how long to pair the devices based on the policy.

At decision step S214, auto-pairing device program 101 determines if the policy permits auto-unpairing. If the policy does not permit auto-unpairing (decision step S214 "NO" branch), auto-pairing device program 101 ends. If the policy permits auto-pair (decision step S214 "YES" branch), auto-pairing device program 101 proceeds to step S216.

At step S216, auto-pairing device program 101 automatically unpairs the device from another device based on the policy.

FIG. 3 is a block diagram depicting components of a computing device, generally designated 300, suitable for auto-pairing device program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes auto-pairing device program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for auto-pairing device program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
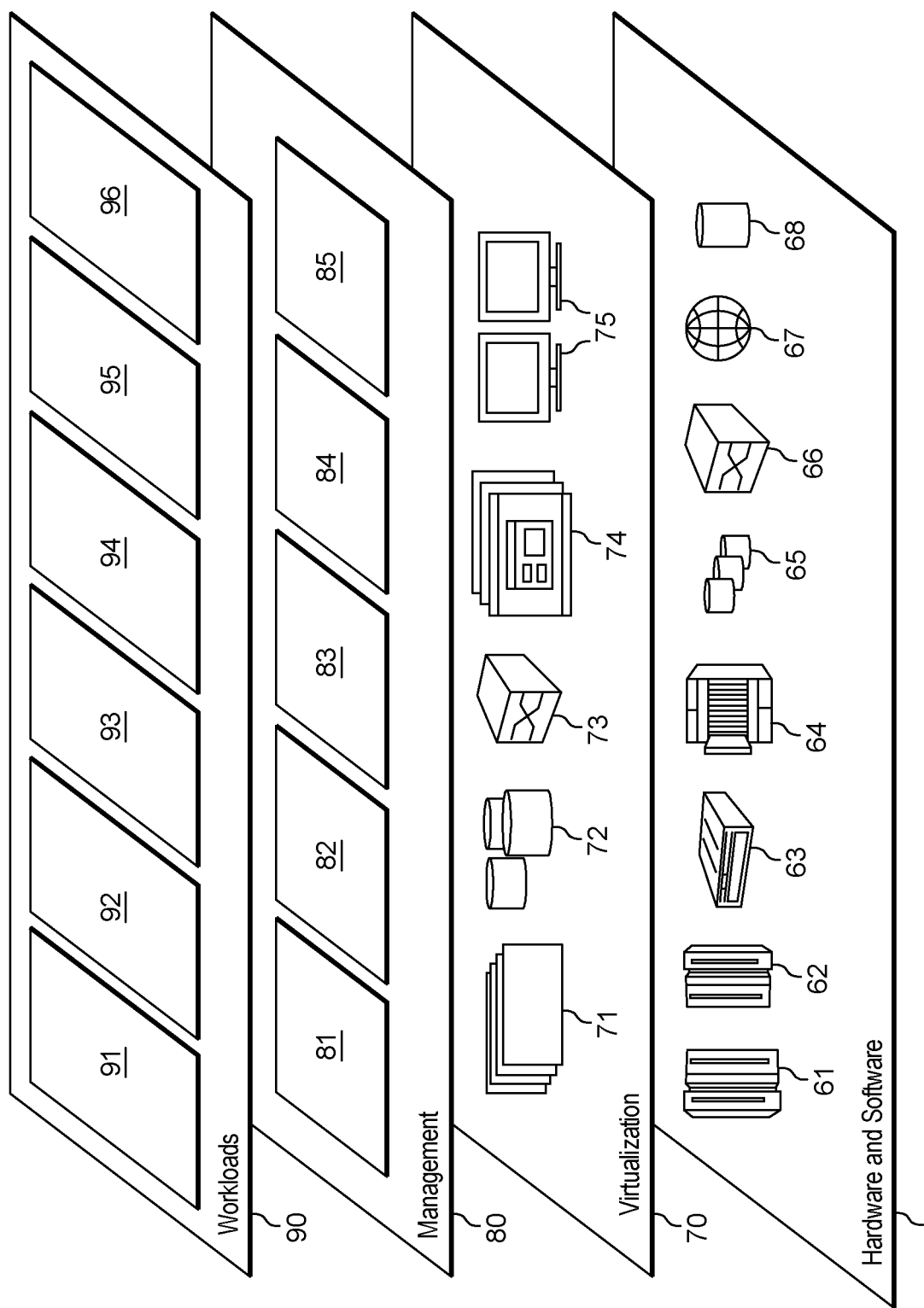
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 3 in accordance with at least one embodiment of the present invention. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and movement based auto-pairing 96.

What is claimed is:

1. A computer-implemented method for automatically pairing two devices, the computer-implemented method comprising:
    detecting a first type of movement from a first device, wherein the first type of movement from the first device is a sequence of ordered movements;
    determining that the first device is located within a threshold distance of a second device when the first type of movement from the first device is detected;
    determining whether an auto-pairing policy matches the first type of movement from the first device and the threshold distance between the first and second devices;
    generating a new auto-pairing policy for when to automatically pair two devices based, at least in part, on historical device movement patterns, a length of previous device pairings, and proximities of devices performing the historical device movement patterns when previously paired; and
    responsive to determining that the auto-pairing policy matches the first type of movement from the first device and the threshold distance between the first and second devices:
        automatically pairing the first device and the second device.

2. The computer-implemented method of claim 1, further comprising:
    detecting a second type of movement from the first device; and
    automatically un-pairing the first device and the second device based on the second type of movement.

3. The computer-implemented method of claim 1, wherein automatically pairing the first device and the second device is further responsive to:
    detecting a second type of movement from the second device; and
    determining that the auto-pairing policy matches the second type of movement from the second device.

4. The computer-implemented method of claim 1, wherein determining whether the auto-pairing policy matches the first type of movement from the first device is further based, at least in part, on a particular device associated with the first type of movement.

5. The computer-implemented method of claim 1, further comprising:
    determining that the auto-pairing policy does not match the first type of movement from the first device and the threshold distance between the first and second devices;
    determining that the first device and the second device are historically paired when the first device is located within the threshold distance of the second device when performing the first type of movement; and
    responsive to determining that the first device and the second device are historically paired when the first device is located within the threshold distance of the second device when performing the first type of movement:
        automatically pairing the first device and the second device.

6. A computer program product for automatically pairing two devices, the computer program product comprising one or more computer readable storage media and program instructions stored on the one or more computer readable storage media, the program instructions including instructions to:
    detect a first type of movement from a first device, wherein the first type of movement from the first device is a sequence of ordered movements;
    determine that the first device is located within a threshold distance of a second device when the first type of movement from the first device is detected;
    determine whether an auto-pairing policy matches the first type of movement from the first device and the threshold distance between the first and second devices;
    generate a new auto-pairing policy for when to automatically pair two devices based, at least in part, on historical device movement patterns, a length of previous device pairings, and proximities of devices performing the historical device movement patterns when previously paired; and
    responsive to determining that the auto-pairing policy matches the first type of movement from the first device and the threshold distance between the first and second devices:
        automatically pair the first device and the second device.

7. The computer program product of claim 6, further comprising instructions to:
    detect a second type of movement from the first device; and
    automatically un-pair the first device and the second device based on the second type of movement.

8. The computer program product of claim 6, wherein the instructions to automatically pair the first device and the second device is further responsive to:
    detect a second type of movement from the second device; and
    determine that the auto-pairing policy matches the second type of movement from the second device.

9. The computer program product of claim 6, wherein the instructions to determine whether the auto-pairing policy matches the first type of movement from the first device is further based, at least in part, on a particular device associated with the first type of movement.

10. The computer program product of claim 6, further comprising instructions to:
determine that the auto-pairing policy does not match the first type of movement from the first device and the threshold distance between the first and second devices;
determine that the first device and the second device are historically paired when the first device is located within the threshold distance of the second device when performing the first type of movement; and
responsive to determining that the first device and the second device are historically paired when the first device is located within the threshold distance of the second device when performing the first type of movement:
automatically pair the first device and the second device.

11. A computer system for automatically pairing two devices, comprising:
one or more computer processors;
one or more computer readable storage media; and
computer program instructions, the computer program instructions being stored on the one or more computer readable storage media for execution by the one or more computer processors, the computer program instructions including instructions to:
detect a first type of movement from a first device, wherein the first type of movement from the first device is a sequence of ordered movements;
determine that the first device is located within a threshold distance of a second device when the first type of movement from the first device is detected;
determine whether an auto-pairing policy matches the first type of movement from the first device and the threshold distance between the first and second devices;
generate a new auto-pairing policy for when to automatically pair two devices based, at least in part, on historical device movement patterns, a length of previous device pairings, and proximities of devices performing the historical device movement patterns when previously paired; and
responsive to determining that the auto-pairing policy matches the first type of movement from the first device and the threshold distance between the first and second devices:
automatically pair the first device and the second device.

12. The computer system of claim 11, further comprising instructions to:
detect a second type of movement from the first device; and
automatically un-pair the first device and the second device based on the second type of movement.

13. The computer system of claim 11, wherein the instructions to automatically pair the first device and the second device is further responsive to:
detect a second type of movement from the second device; and
determine that the auto-pairing policy matches the second type of movement from the second device.

14. The computer system of claim 11, wherein the instructions to determine whether the auto-pairing policy matches the first type of movement from the first device is further based, at least in part, on a particular device associated with the first type of movement.

15. The computer system of claim 11, further comprising instructions to:
determine that the auto-pairing policy does not match the first type of movement from the first device and the threshold distance between the first and second devices;
determine that the first device and the second device are historically paired when the first device is located within the threshold distance of the second device when performing the first type of movement; and
responsive to determining that the first device and the second device are historically paired when the first device is located within the threshold distance of the second device when performing the first type of movement:
automatically pair the first device and the second device.

* * * * *